United States Patent
Lim

(10) Patent No.: US 9,359,041 B1
(45) Date of Patent: Jun. 7, 2016

(54) PEDAL-OPERATED SCOOTER

(71) Applicant: Sherman Lim, Montebello, CA (US)

(72) Inventor: Sherman Lim, Montebello, CA (US)

(*) Notice: Subject to any disclaimer, the term of this patent is extended or adjusted under 35 U.S.C. 154(b) by 0 days.

(21) Appl. No.: 14/715,816

(22) Filed: May 19, 2015

(51) Int. Cl.
| | |
|---|---|
| *B62K 5/00* | (2013.01) |
| *B62J 1/08* | (2006.01) |
| *B62M 1/26* | (2013.01) |
| *B62M 1/36* | (2013.01) |
| *B62M 9/02* | (2006.01) |
| *B62J 1/02* | (2006.01) |
| *B62J 7/06* | (2006.01) |
| *B62J 7/04* | (2006.01) |
| *B62K 9/00* | (2006.01) |
| *B62K 21/12* | (2006.01) |

(52) U.S. Cl.
CPC ... *B62M 1/36* (2013.01); *B62J 1/02* (2013.01); *B62J 7/04* (2013.01); *B62J 7/06* (2013.01); *B62K 9/00* (2013.01); *B62K 21/12* (2013.01); *B62M 1/26* (2013.01); *B62M 9/02* (2013.01); *B62J 1/08* (2013.01); *B62K 5/00* (2013.01)

(58) Field of Classification Search
CPC ............ B62K 3/002; B62K 3/02; B62K 5/00; B62K 5/02; B62K 13/00; B62K 19/02; B62K 19/36; B62K 21/12; B62K 9/00; B60J 1/08; B60J 1/10; B60J 7/04; B62M 1/26; B62M 1/36; B62M 9/02
USPC .............. 280/253, 256, 259, 220; 297/215.14
See application file for complete search history.

(56) References Cited

U.S. PATENT DOCUMENTS

| | | | | |
|---|---|---|---|---|
| 1,567,144 | A * | 12/1925 | Heck ...................... | B62M 11/00 280/1.12 |
| 1,707,618 | A * | 4/1929 | Keogh ..................... | B62M 1/18 280/215 |
| 2,723,131 | A | 11/1955 | Mcchesney, Jr. | |
| 4,828,284 | A * | 5/1989 | Sandgren ............... | B62K 3/002 280/221 |
| 5,630,774 | A * | 5/1997 | Geschwender ........ | B62K 3/002 280/267 |
| 6,311,994 | B1 | 11/2001 | Wang | |
| 6,375,208 | B1 * | 4/2002 | Lee ....................... | A63B 21/157 280/220 |
| 6,505,845 | B1 | 1/2003 | Fong | |
| 6,715,779 | B2 * | 4/2004 | Eschenbach .......... | B62K 3/002 280/221 |
| D494,512 | S | 8/2004 | Cheng | |
| 6,866,109 | B2 | 3/2005 | Roach | |
| D579,987 | S | 11/2008 | Hong | |
| 7,654,549 | B2 * | 2/2010 | Hutson ................... | B62J 1/00 280/220 |
| 9,114,848 | B2 * | 8/2015 | Scolari .................. | B62K 3/002 |
| 2007/0235974 | A1 * | 10/2007 | Vargas ................... | B62K 3/002 280/256 |
| 2008/0054588 | A1 | 3/2008 | Walker | |

FOREIGN PATENT DOCUMENTS

| | | | | |
|---|---|---|---|---|
| DE | 4232655 | * | 3/1994 | ................. B62J 1/06 |
| DE | 102005043423 | * | 3/2007 | ................. B62J 1/00 |
| FR | 2802171 | * | 6/2001 | |
| WO | WO2005016737 | A1 | 2/2005 | |

* cited by examiner

*Primary Examiner* — Anne Marie Boehler

(57) ABSTRACT

The pedal-operated scooter is a scooter with a plurality of wheels, which are further defined as including at least one rear wheel and at least one front wheel. The at least one rear wheel is in mechanical connection with a drive sprocket that is in mechanical connection with a pedal sprocket. The pedal sprocket is in mechanical connection with a pair of pedals provided on the scooter. The pair of pedals are able to be manipulated via a rider in order to propel the scooter. Moreover, rotation of the pair of pedals, rotates the pedal sprocket that is attached to the drive sprocket via a chain or belt. The drive sprocket in turn drives the at least one rear wheel. The scooter includes a handlebar, and a seat.

5 Claims, 5 Drawing Sheets

PEDAL-OPERATED SCOOTER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of scooters, more specifically, a scooter that includes pedals and a handlebar that when manipulated propel the scooter.

SUMMARY OF INVENTION

The pedal-operated scooter is a scooter with a plurality of wheels, which are further defined as including at least one rear wheel and at least one front wheel. The at least one rear wheel is in mechanical connection with a drive sprocket that is in mechanical connection with a pedal sprocket. The pedal sprocket is in mechanical connection with a pair of pedals provided on the scooter. The pair of pedals are able to be manipulated via a rider in order to propel the scooter. Moreover, rotation of the pair of pedals, rotates the pedal sprocket that is attached to the drive sprocket via a chain or belt. The drive sprocket in turn drives the at least one rear wheel. The scooter includes a handlebar, and a seat. The seat is able to rotate forward for use with the rider or rearward where the rider wants to stand and pedal the scooter. The front includes a basket; whereas the rear includes a storage compartment. The storage compartment is located behind the seat. The handlebar connects to a steering shaft that is in mechanical connection with a rack and pinion. The rack and pinion are in turn connected to at least one tie rod joint that in turn is in mechanical connection with the at least one front wheel.

It is an object of the invention to provide a scooter that includes at least one front wheel and at least one rear wheel, and which is propelled via a pair of pedals that a rider manipulates with feet.

It is another object of the invention to provide a scooter that includes a seat that is able to move forward for in use or rearward where the rider wishes to stand whilst riding the scooter.

It is another object of the invention to provide a scooter that includes a handlebar that steers that at least one front wheel via a rack and pinion and tire joint.

These together with additional objects, features and advantages of the pedal-operated scooter will be readily apparent to those of ordinary skill in the art upon reading the following detailed description of the presently preferred, but nonetheless illustrative, embodiments when taken in conjunction with the accompanying drawings.

In this respect, before explaining the current embodiments of the pedal-operated scooter in detail, it is to be understood that the pedal-operated scooter is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the pedal-operated scooter.

It is therefore important that the claims be regarded as including such equivalent construction insofar as they do not depart from the spirit and scope of the pedal-operated scooter. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
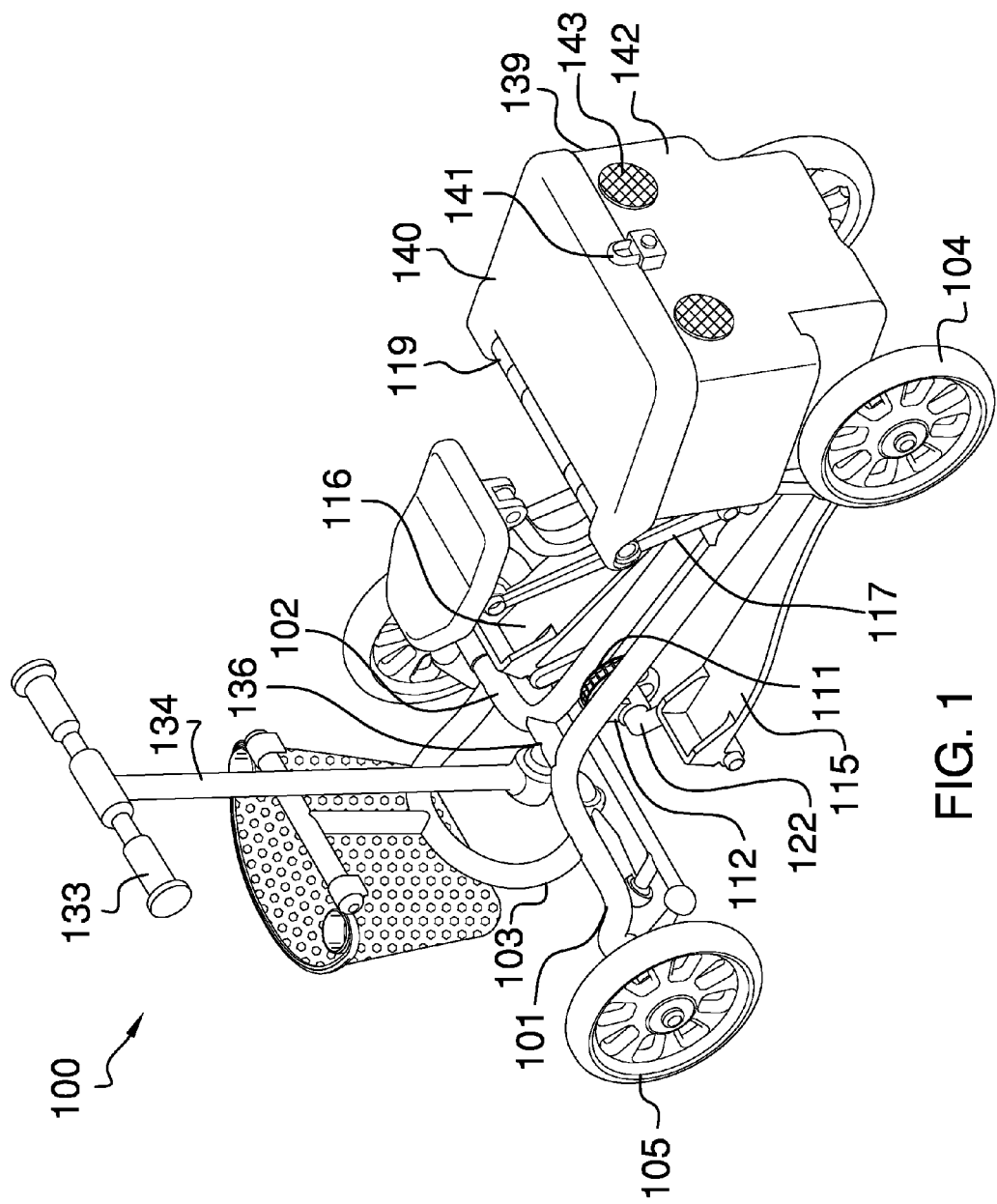
FIG. 1 is a perspective view of an embodiment of the disclosure.
Figure 2:
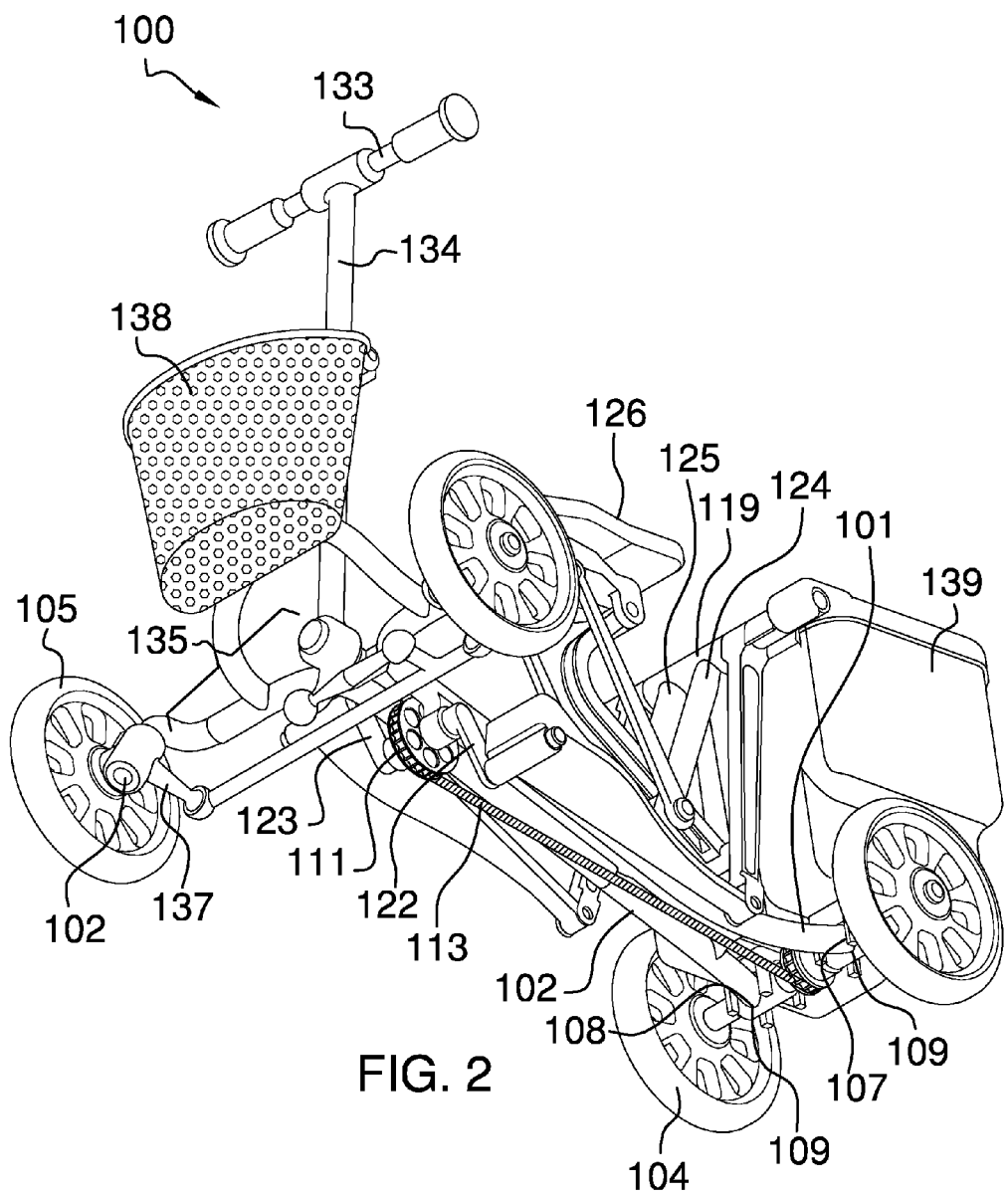
FIG. 2 is a second, perspective view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a potential embodiments of the disclosure, which is illustrated in FIGS. 1 through 5. The pedal-operated scooter 100 (hereinafter invention) includes a first frame member 101, a second frame member 102, and a third frame member 103. The third frame member 103 is generally U-shaped, and is affixed to both the first frame member 101 and the second frame member 102. The third frame member 103 extends forwardly with respect to the first frame member 101 and the second frame member 102.

The invention 100 includes at least one rear wheel 104 and at least one front wheel 105. The at least one rear wheel 104 is closer to a central axis 500 than the at least one front wheel 105 (see FIG. 5). The at least one rear wheel 104 is affixed to a rear axle 106. Both the rear axle 106 and the at least one rear wheel 104 are rotatably engaged with respect to the first frame member 101 and the second frame member 102. The first frame member 101 is further defined with a first rear end 107, whereas the second frame member 102 is further defined with a second rear end 108. Both the first rear end 107 and the second rear end 108 are each affixed to a rear bearing 109 that is rotatably affixed to the rear axle 106.

The rear axle 106 includes a drive sprocket 110 thereon. The first frame member 101 and the second frame member 102 have a pedal sprocket 111 affixed thereto via a pedal sprocket bracket 112. The pedal sprocket 111 is positioned forward of the invention 100 with respect to the drive sprocket 110. Moreover, a chain 113 connects the drive sprocket 111 to the pedal sprocket 111 such that the drive sprocket 111 rotates in concert with the pedal sprocket 111. The chain 113 may be a belt.

Figure 3:
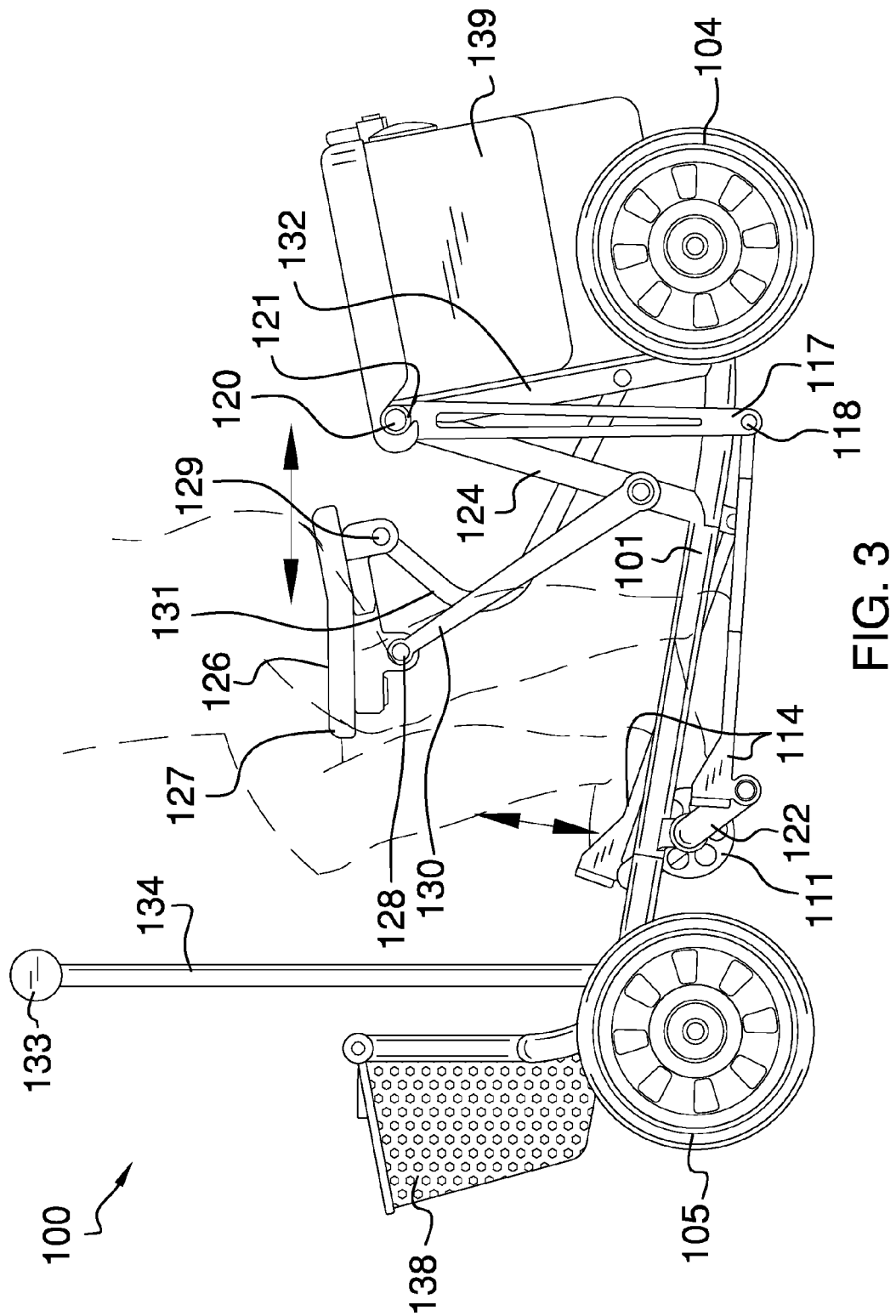
FIG. 3 is a side view of an embodiment of the disclosure.
Figure 4:
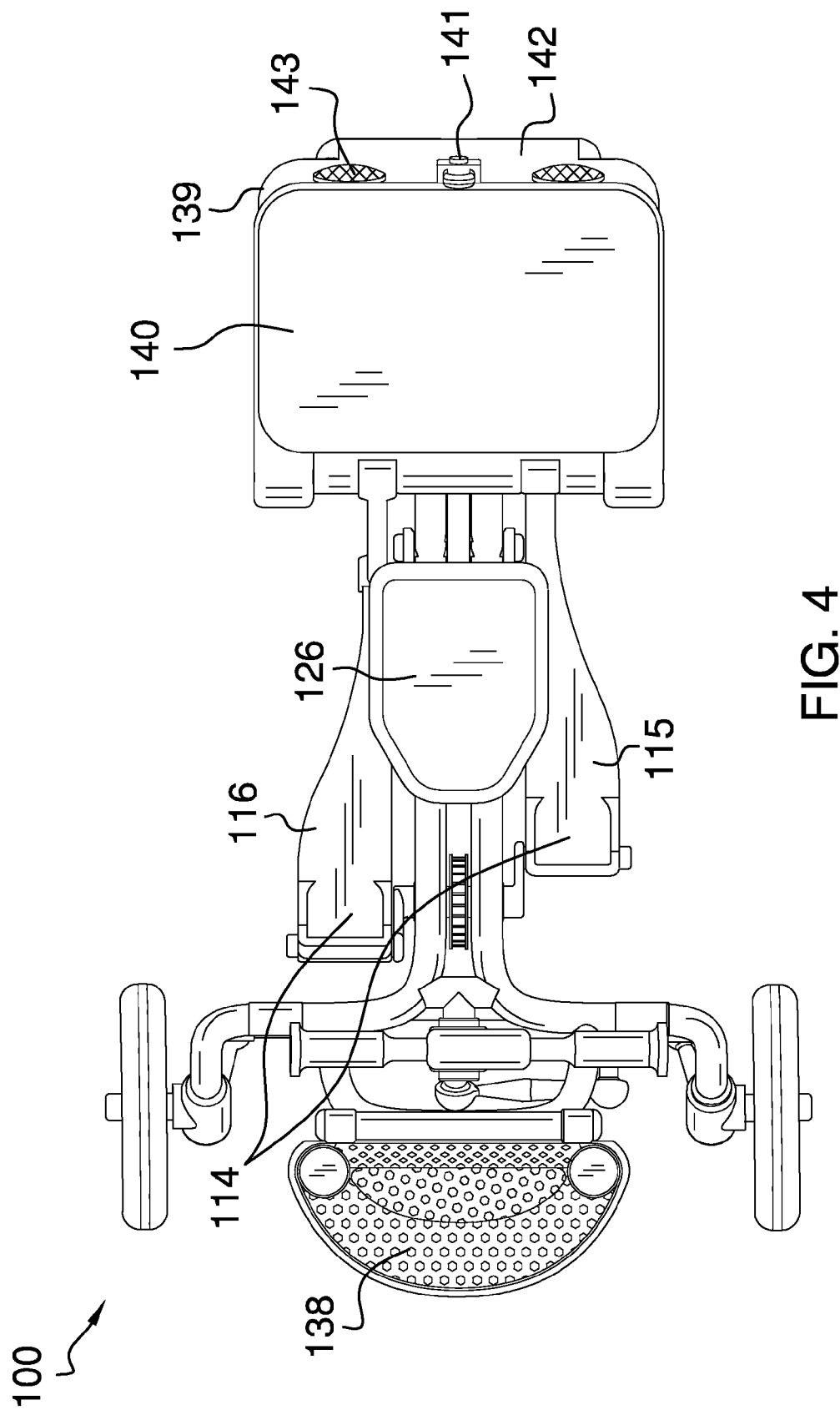
FIG. 4 is a top view of an embodiment of the disclosure.
Figure 5:
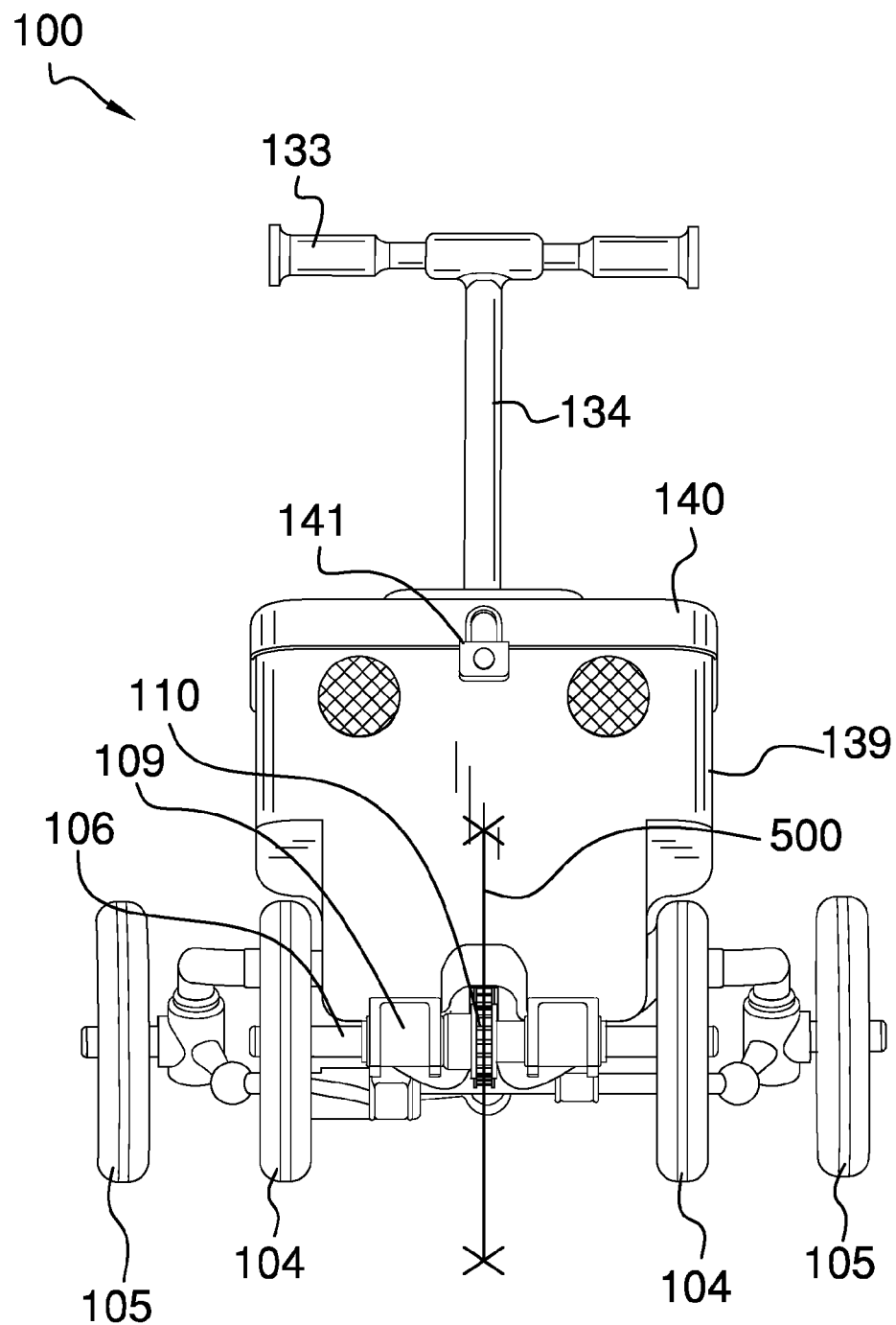
FIG. 5 is a rear view of an embodiment of the disclosure.

The pedal sprocket 111 is affixed to a pair of pedals 114. The pair of pedals 114 are further defined with a left pedal 115 and a right pedal 116. The left pedal 115 is located aside of the first frame member 101; whereas the right pedal 116 is located aside of the second frame member 102. The pedal sprocket 111 rotates upon movement of the pair of pedals 114. Referring to FIG. 3, the pair of pedals 114 each have a pedal armature 117 located at a rear pedal end 118. The pedal armature 117 is able to pivot with respect to the rear pedal end 118. Moreover, the pedal armature 117 extends upwardly to an upper frame member 119. The pedal armature 117 includes a fourth end 120 that pivots with respect to a frame member pivot 121. The left pedal 115 is rotatably engaged to a left sprocket armature 122 of the pedal sprocket 111; whereas the right pedal 116 is rotatably engaged to a right sprocket armature 123 of the pedal sprocket 111.

The upper frame member 119 is affixed to a fourth frame member 124 and a fifth frame member 125. Both the fourth frame member 124 and the fifth frame member 125 are vertically oriented. The fourth frame member 124 attaches to the upper frame member 119 and the first frame member 101. The fifth frame member 125 attaches to the upper frame member 119 and the second frame member 102. The upper frame member 119 is horizontally-oriented. The pedal armature 117 enables the pair of pedals 114 to rotate the drive sprocket 111 whilst moving in a translational arrangement. Also, the pair of pedals 114 are 180 degrees offset from one another.

The invention 100 includes a seat 126. The seat 126 includes a seat bracket 127 that is located underneath the seat 126. The seat bracket 127 includes a first seat pivot 128 and a second seat pivot 129. The first seat pivot 128 enables a first seat armature 130 to attach and pivot with respect to the seat bracket 127. The second seat pivot 129 enables a second seat armature 131 to attach and pivot with respect to the seat bracket 127. The first seat armature 130 attaches to and pivots with respect to the fourth frame member 124. The second seat armature 131 attaches to and pivots with respect to a sixth frame member 132. The first seat armature 130 and the second seat armature 131 enable the seat 126 to extend back and forth (see FIG. 3). Moreover, a rider 300 that is operating the invention 100 is able to choose between riding on the seat 126 and pedaling the pair of pedals 114 or standing on the pair of pedals 114.

A handlebar 133 connects to a steering shaft 134. The steering shaft 134 connects to a rack and pinion assembly 135. The rack and pinion assembly 135 attaches to a seventh frame member 136. The seventh frame member 136 attaches between the first frame member 101 and the second frame member 102. The rack and pinion assembly 135 is well known in the art unit pertaining to vehicles (both motorized and manually-propelled). Moreover, the rack and pinion assembly 135 connect to at least one tie rod joint 137. The at least one tie rod joint 137 connects with the at least one front wheel 105. Moreover, the at least one front wheel 105 is able to rotate directionally with respect to the at least one tie rod joint 137 in order to steer the invention 100. The at least one tie rod joint 137 is affixed to either the first frame member 101 or the second frame member 102.

The third frame member 103 may include a front basket 138. The invention 100 may include a storage compartment 139. The storage compartment 139 is located at the rear portion of the invention 100. Moreover, the storage compartment 139 is affixed to the rear bearings 109. Both the front basket 138 and the storage compartment 139 are able to store items therein. the storage compartment 139 may be further defined with a compartment lid 140 that is pivotably attached to the upper frame member 119. The compartment lid 140 opens to expose an interior of the storage compartment 139. Moreover, a lid lock 141 may be attached to both the storage compartment 139 and the compartment lid 140 in order to secure the compartment lid 140 when the invention 100 is in use. The storage compartment 139 may be further defined with a rear surface 142 that includes at least one light reflector 143 thereon.

In use, the invention 100 is propelled upon translational movement of the pair of pedals 114, which in turn rotates both the drive sprocket 110 and the pedal sprocket 111. The invention 100 is steered via the handlebar 133 in order to rotate the at least one front wheel 105. The invention 100 may include brakes on the handlebar 133, which are in mechanical connection with brake pads located on either the at least one front wheel 105 and/or the at least one rear wheel 104.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A pedal-operated scooter comprising:
at least one front wheel and at least one rear wheel;
wherein a pair of pedals rotate a pedal sprocket that in turn rotates a drive sprocket;
wherein the drive sprocket is connected to the at least one rear wheel;
wherein a handlebar connects to and rotates direction of the at least one front wheel in order to steer the pedal-operated scooter;
wherein a seat moves forwardly or rearwardly; wherein said seat moves forwardly for sitting whilst pedaling of the pedal-operated scooter and said seat moves rearwardly for standing whilst pedaling of the pedal-operated scooter;
wherein the seat includes a seat bracket that is located underneath the seat; wherein the seat bracket includes a first seat pivot and a second seat pivot; wherein the first seat pivot enables a first seat armature to attach and pivot with respect to the seat bracket; wherein the second seat pivot enables a second seat armature to attach and pivot with respect to the seat bracket;

wherein the pedal-operated scooter is further defined with a first frame member, a second frame member, and a third frame member; wherein the third frame member is generally U-shaped, and is affixed to both the first frame member and the second frame member; wherein the third frame member extends forwardly with respect to the first frame member and the second frame member;

wherein the at least one rear wheel is closer to a central axis than the at least one front wheel;

wherein the at least one rear wheel is affixed to a rear axle; wherein the rear axle and the at least one rear wheel are rotatably engaged with respect to the first frame member and the second frame member;

wherein the first frame member is further defined with a first rear end, whereas the second frame member is further defined with a second rear end; wherein both the first rear end and the second rear end are each affixed to a rear bearing that is rotatably affixed to the rear axle;

wherein the rear axle includes the drive sprocket thereon;

wherein the first frame member and the second frame member have the pedal sprocket affixed thereto via a pedal sprocket bracket;

wherein the pedal sprocket is positioned forward of the pedal-operated scooter with respect to the drive sprocket;

wherein a chain or a belt connects the drive sprocket to the pedal sprocket such that the drive sprocket rotates in concert with the pedal sprocket;

wherein the pedal sprocket is affixed to the pair of pedals; wherein the pair of pedals is further defined with a left pedal and a right pedal;

wherein the left pedal is located aside of the first frame member; whereas the right pedal is located aside of the second frame member; wherein the pedal sprocket rotates upon movement of the pair of pedals;

wherein the pair of pedals each have a pedal armature located at a rear pedal end; wherein the pedal armature is able to pivot with respect to the rear pedal end; wherein the pedal armature extends upwardly to an upper frame member;

wherein the pedal armature includes a fourth end that pivots with respect to a frame member pivot; wherein the left pedal is rotatably engaged to a left sprocket armature of the pedal sprocket; wherein the right pedal is rotatably engaged to a right sprocket armature of the pedal sprocket;

wherein the upper frame member is affixed to a fourth frame member and a fifth frame member; wherein both the fourth frame member and the fifth frame member are vertically oriented; wherein the fourth frame member attaches to the upper frame member and the first frame member; wherein the fifth frame member attaches to the upper frame member and the second frame member; wherein the upper frame member is horizontally-oriented; wherein the pedal armature enables the pair of pedals to rotate the drive sprocket whilst moving in a translational arrangement; wherein the left pedal is 180 degrees offset from the right pedal;

wherein the first seat armature attaches to and pivots with respect to the fourth frame member; wherein the second seat armature attaches to and pivots with respect to a sixth frame member; wherein the first seat armature and the second seat armature enable the seat to extend back and forth.

2. The pedal-operated scooter according to claim 1 wherein the handlebar connects to a steering shaft; wherein the steering shaft connects to a rack and pinion assembly; wherein the rack and pinion assembly attaches to a seventh frame member; wherein the seventh frame member attaches between the first frame member and the second frame member.

3. The pedal-operated scooter according to claim 2 wherein the rack and pinion assembly connect to at least one tie rod joint; wherein the at least one tie rod joint connects with the at least one front wheel; wherein the at least one front wheel is able to rotate directionally with respect to the at least one tie rod joint in order to steer the pedal-operated scooter.

4. The pedal-operated scooter according to claim 3 wherein the third frame member includes a front basket; wherein a storage compartment affixed to the rear bearings; wherein both the front basket and the storage compartment are able to store items therein.

5. The pedal-operated scooter according to claim 4 wherein the storage compartment is further defined with a compartment lid that is pivotably attached to the upper frame member; wherein the compartment lid opens to expose an interior of the storage compartment; wherein a lid lock is attached to both the storage compartment and the compartment lid in order to secure the compartment lid; wherein the storage compartment is further defined with a rear surface that includes at least one light reflector thereon.

* * * * *